US012718306B2

(12) United States Patent
Chaudhary et al.

(10) Patent No.: US 12,718,306 B2
(45) Date of Patent: Aug. 25, 2026

(54) COMPUTER-BASED METHOD AND SYSTEM FOR MANAGING A FOOD INVENTORY OF A FLIGHT

(71) Applicant: Capital One Services, LLC, McLean, VA (US)

(72) Inventors: Viraj Chaudhary, Katy, TX (US); Abdelkader M'Hamed Benkreira, Brooklyn, NY (US); Jennifer Kwok, New York, NY (US)

(73) Assignee: Capital One Services, LLC, McLean, VA (US)

( * ) Notice: Subject to any disclaimer, the term of this patent is extended or adjusted under 35 U.S.C. 154(b) by 145 days.

(21) Appl. No.: 18/393,191

(22) Filed: Dec. 21, 2023

(65) Prior Publication Data

US 2024/0193711 A1 Jun. 13, 2024

Related U.S. Application Data

(63) Continuation of application No. 17/318,331, filed on May 12, 2021, now Pat. No. 11,854,099.

(51) Int. Cl.
*G06Q 10/0631* (2023.01)
*G06Q 10/0875* (2023.01)
*G06Q 50/12* (2012.01)

(52) U.S. Cl.
CPC ....... *G06Q 50/12* (2013.01); *G06Q 10/06315* (2013.01); *G06Q 10/0875* (2013.01)

(58) Field of Classification Search
None
See application file for complete search history.

(56) References Cited

U.S. PATENT DOCUMENTS 8,997,159 B2 3/2015 Ogilvie
9,114,748 B1 * 8/2015 Blatstein .............. B60P 1/6427
(Continued)

OTHER PUBLICATIONS

Djatna et al., "Real time key element extraction for design of in flight meal services based on passenger's personality traits." 2014 6th International Conference on Information Technology and Electrical Engineering (ICITEE). IEEE, 2014. (Year: 2014).

*Primary Examiner* — Sara Grace Brown
(74) *Attorney, Agent, or Firm* — GREENBERG TRAURIG, LLP

(57) ABSTRACT

An exemplary method includes receiving, by a processor, flight information from a computer device associated with an airline identifying a flight and passengers on the flight that purchased flight tickets by utilizing payment cards associated with a card authorizing entity. Passenger food preferences for the flight passengers based at least in part on historical payment card transaction data of the flight passengers is received from a computing device associated with the card authorizing entity based on the flight information. A food inventory available to be serviced on the flight is received. Automatically determining a flight-specific food inventory, to minimize an overall weight of the flight-specific food inventory to be carried by the flight based on the passenger food preferences. Automatically transmitting food packing instructions to a packing-related machine based on the flight-specific food inventory so as to assemble a portion of the flight-specific food inventory.

14 Claims, 10 Drawing Sheets

(56) References Cited

U.S. PATENT DOCUMENTS

| | | | |
|---|---|---|---|
| 9,925,997 | B2 | 3/2018 | Wesselink et al. |
| 11,205,196 | B1 * | 12/2021 | Raviv ................... H04L 67/306 |
| 2007/0168205 | A1 * | 7/2007 | Carlson .................. G06Q 30/00 705/5 |
| 2009/0210262 | A1 | 8/2009 | Rines et al. |
| 2011/0040655 | A1 | 2/2011 | Hendrickson |
| 2013/0046717 | A1 | 2/2013 | Grigg et al. |
| 2013/0246125 | A1 * | 9/2013 | DiGioacchino .... G06Q 30/0201 705/7.33 |
| 2015/0294227 | A1 * | 10/2015 | Digby-Jones .......... G06Q 10/04 706/47 |
| 2015/0324810 | A1 | 11/2015 | Vincent et al. |
| 2016/0005072 | A1 | 1/2016 | Robinson |
| 2016/0080913 | A1 * | 3/2016 | Thogersen ............. G08G 99/00 455/456.3 |
| 2016/0092972 | A1 | 3/2016 | Blatstein et al. |
| 2016/0189069 | A1 | 6/2016 | de Montfort Walker et al. |
| 2016/0251101 | A1 | 9/2016 | Kong et al. |
| 2017/0140345 | A1 * | 5/2017 | Lee .................... G06Q 20/3276 |
| 2017/0148081 | A1 | 5/2017 | Chauhan |
| 2017/0180505 | A1 | 6/2017 | Shaw et al. |
| 2017/0336223 | A1 | 11/2017 | Bakshiram et al. |
| 2018/0330307 | A1 * | 11/2018 | Anderson ............... H04W 4/02 |
| 2018/0349485 | A1 | 12/2018 | Carlisle et al. |
| 2019/0095942 | A1 | 3/2019 | Lee et al. |
| 2019/0116394 | A1 | 4/2019 | Kinoshita et al. |
| 2019/0303803 | A1 | 10/2019 | Buc et al. |
| 2020/0211059 | A1 | 7/2020 | Joglekar et al. |
| 2020/0211309 | A1 | 7/2020 | Daniel et al. |
| 2021/0024215 | A1 * | 1/2021 | Browne ................. A47B 31/06 |
| 2021/0039786 | A1 | 2/2021 | Al Shamsi et al. |
| 2021/0264326 | A1 | 8/2021 | Annakov et al. |
| 2021/0294485 | A1 * | 9/2021 | Li ...................... G06Q 10/1093 |
| 2022/0092056 | A1 * | 3/2022 | Sekar ..................... G06Q 10/10 |
| 2022/0405653 | A1 * | 12/2022 | Villa ...................... G06Q 50/40 |

* cited by examiner

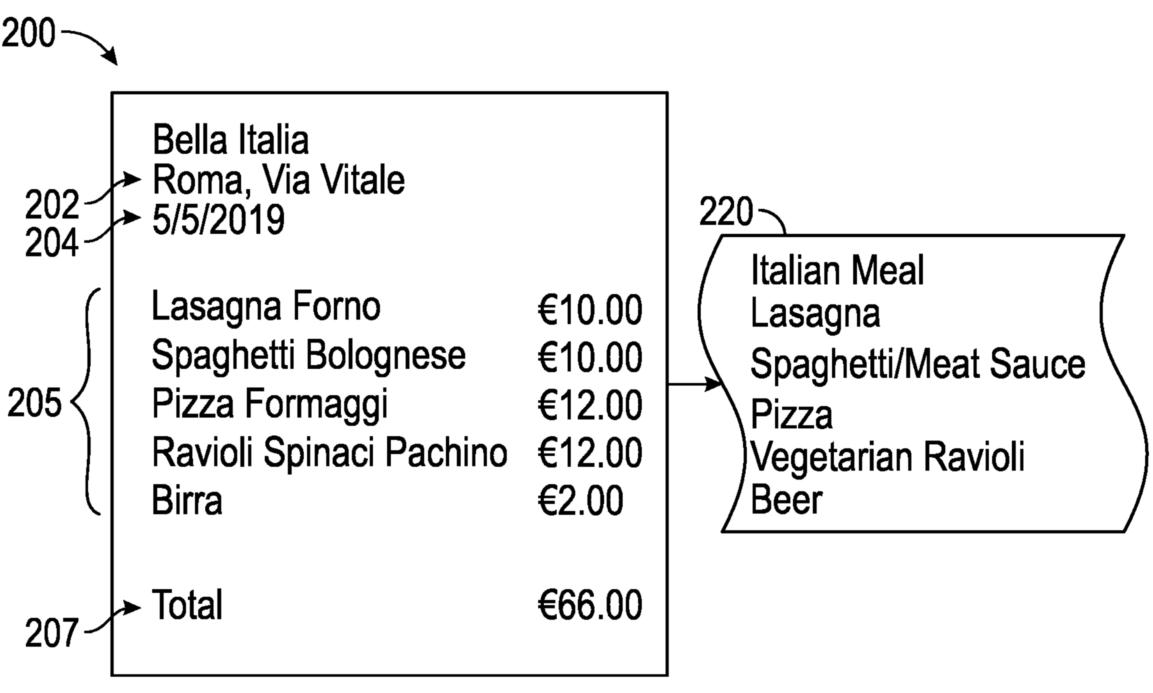
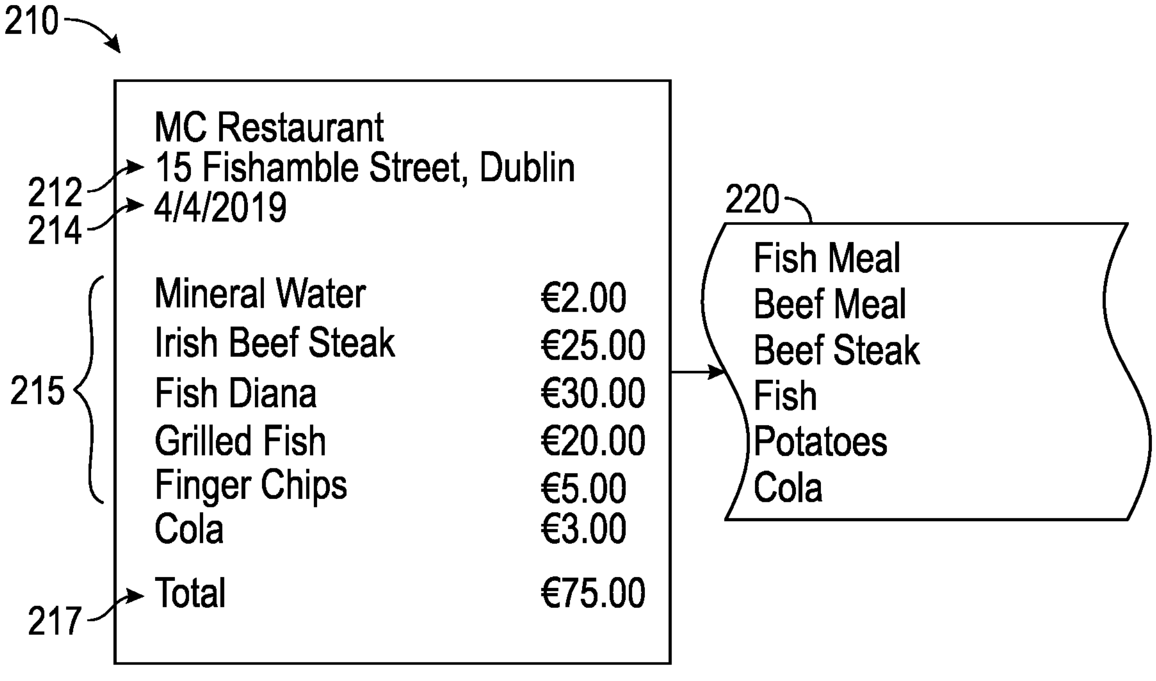
FIG. 2A

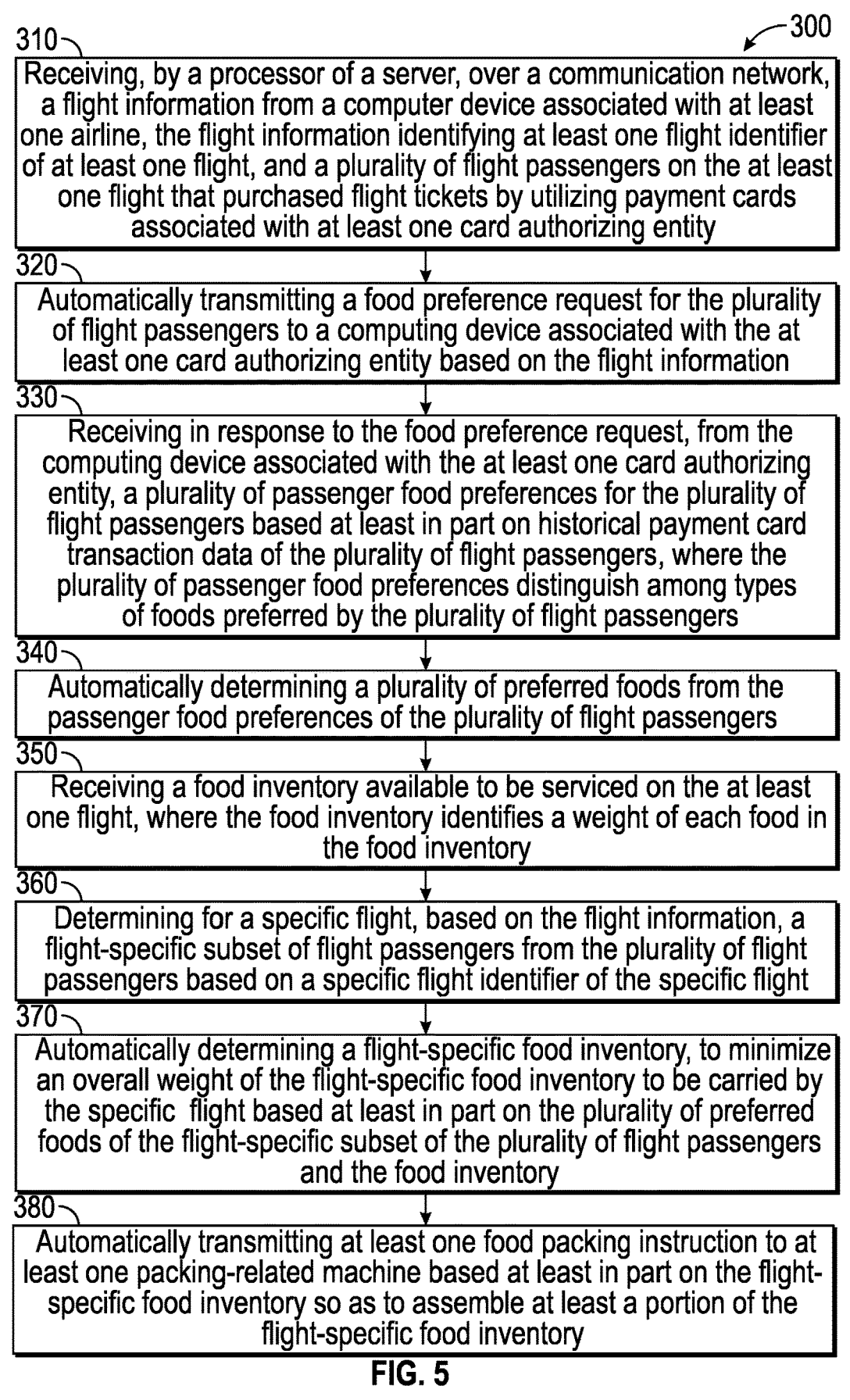

300

310 Receiving, by a processor of a server, over a communication network, a flight information from a computer device associated with at least one airline, the flight information identifying at least one flight identifier of at least one flight, and a plurality of flight passengers on the at least one flight that purchased flight tickets by utilizing payment cards associated with at least one card authorizing entity 320 Automatically transmitting a food preference request for the plurality of flight passengers to a computing device associated with the at least one card authorizing entity based on the flight information 330 Receiving in response to the food preference request, from the computing device associated with the at least one card authorizing entity, a plurality of passenger food preferences for the plurality of flight passengers based at least in part on historical payment card transaction data of the plurality of flight passengers, where the plurality of passenger food preferences distinguish among types of foods preferred by the plurality of flight passengers 340 Automatically determining a plurality of preferred foods from the passenger food preferences of the plurality of flight passengers 350 Receiving a food inventory available to be serviced on the at least one flight, where the food inventory identifies a weight of each food in the food inventory 360 Determining for a specific flight, based on the flight information, a flight-specific subset of flight passengers from the plurality of flight passengers based on a specific flight identifier of the specific flight 370 Automatically determining a flight-specific food inventory, to minimize an overall weight of the flight-specific food inventory to be carried by the specific flight based at least in part on the plurality of preferred foods of the flight-specific subset of the plurality of flight passengers and the food inventory 380 Automatically transmitting at least one food packing instruction to at least one packing-related machine based at least in part on the flight-specific food inventory so as to assemble at least a portion of the flight-specific food inventory

FIG. 5

COMPUTER-BASED METHOD AND SYSTEM FOR MANAGING A FOOD INVENTORY OF A FLIGHT

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Services, LLC., All Rights Reserved.

FIELD OF TECHNOLOGY

The present disclosure generally relates to computing systems, and more particularly to computer-based method and system for managing a food inventory of a flight.

BACKGROUND OF TECHNOLOGY

A computer network platform/system may include a group of computers (e.g., clients, servers, smart routers) and other computing hardware devices that are linked together through one or more communication channels to facilitate communication and/or resource-sharing among a wide range of users.

SUMMARY OF DESCRIBED SUBJECT MATTER

In some embodiments, the present disclosure provides an exemplary technically improved computer-based method that includes at least the following steps of: receiving, by a processor of a server, over a communication network, a flight information from a computer device associated with at least one airline, the flight information identifying i) at least one flight identifier of at least one flight, and ii) a plurality of flight passengers on the at least one flight that purchased flight tickets by utilizing payment cards associated with at least one card authorizing entity. A food preference request for the plurality of flight passengers may be transmitted to a computing device associated with the at least one card authorizing entity based on the flight information. A plurality of passenger food preferences for the plurality of flight passengers based at least in part on historical payment card transaction data of the plurality of flight passengers may be received, in response to the food preference request, from the computing device associated with the at least one card authorizing entity, where the plurality of passenger food preferences may distinguish among types of foods preferred by the plurality of flight passengers. A plurality of preferred foods may be determined from the passenger food preferences of the plurality of flight passengers. A food inventory available to be serviced on the at least one flight may be received, where the food inventory may identify a weight of each food in the food inventory. A flight-specific subset of flight passengers from the plurality of flight passengers may be determined for a specific flight based on a specific flight identifier of the specific flight. A flight-specific food inventory may be determined to minimize an overall weight of the flight-specific food inventory to be carried by the specific flight based at least in part on: i) the plurality of preferred foods of the flight-specific subset of the plurality of flight passengers and ii) the food inventory. At least one food packing instruction may be transmitted to at least one packing-related machine based at least in part on the flight-specific food inventory so as to assemble at least a portion of the flight-specific food inventory.

In some embodiments, the present disclosure provides an exemplary technically improved computer-based system that includes at least the following components of a non-transitory memory for storing computer code, and a processor of a server. The processor may be configured to execute the computer code that causes the processor to receive, over a communication network, a flight information from a computer device associated with at least one airline, the flight information may identify: i) at least one flight identifier of at least one flight, and ii) a plurality of flight passengers on the at least one flight that purchased flight tickets by utilizing payment cards associated with at least one card authorizing entity; transmit a food preference request for the plurality of flight passengers to a computing device associated with the at least one card authorizing entity based on the flight information; receive in response to the food preference request, from the computing device associated with the at least one card authorizing entity, a plurality of passenger food preferences for the plurality of flight passengers based at least in part on historical payment card transaction data of the plurality of flight passengers where the plurality of passenger food preferences may distinguish among types of foods preferred by the plurality of flight passengers; determine a plurality of preferred foods from the passenger food preferences of the plurality of flight passengers; receive a food inventory available to be serviced on the at least one flight; where the food inventory identifies a weight of each food in the food inventory; determine for a specific flight, based on the flight information, a flight-specific subset of flight passengers from the plurality of flight passengers based on a specific flight identifier of the specific flight; determine a flight-specific food inventory, to minimize an overall weight of the flight-specific food inventory to be carried by the specific flight based at least in part on: i) the plurality of preferred foods of the flight-specific subset of the plurality of flight passengers and ii) the food inventory; and transmit at least one food packing instruction to at least one packing-related machine based at least in part on the flight-specific food inventory so as to assemble at least a portion of the flight-specific food inventory.

In some embodiments, the present disclosure provides an exemplary technically improved computer-based method that includes at least the following steps of receiving, by a processor of a server, over a communication network, a flight information from a computer device associated with at least one airline, the flight information identifying: i) at least one flight identifier of at least one flight, and ii) a plurality of flight passengers on the at least one flight that purchased flight tickets by utilizing payment cards associated with at least one card authorizing entity. A flight-specific subset of flight passengers from the plurality of flight passengers may be determined for a specific flight based on a specific flight identifier of the specific flight. A flight-specific food preference request for the plurality of flight passengers may be transmitted to a computing device associated with the at least one card authorizing entity based on the flight information. A plurality of passenger food preferences for the plurality of flight passengers may be received, in response to the flight-specific food preference request, from the computing device associated with the at least one card authorizing entity, based at least in part on historical payment card transaction data of the plurality of flight passengers, where the plurality of passenger food preferences may distinguish among types of foods preferred by the plurality of flight passengers. A plurality of preferred foods may be determined from the passenger food preferences of the plurality of flight passengers. A food inventory available to be serviced on the at least one flight may be received where the food inventory identifies a weight of each food in the food inventory. A flight-specific food inventory may be determined to minimize an overall weight of the flight-specific food inventory to be carried by the specific flight based at least in part on: i) the plurality of preferred foods of the flight-specific subset of the plurality of flight passengers and ii) the food inventory. At least one food packing instruction may be transmitted to at least one packing-related machine based at least in part on the flight-specific food inventory so as to assemble at least a portion of the flight-specific food inventory.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

FIGS. 2A and 2B depict exemplary data elements for determining passenger food preferences on a flight in accordance with one or more embodiments of the present disclosure;

FIG. 5 illustrates a flowchart of an exemplary method for managing a food inventory of a flight in accordance with one or more embodiments of the present disclosure;

DETAILED DESCRIPTION

Figure 1:
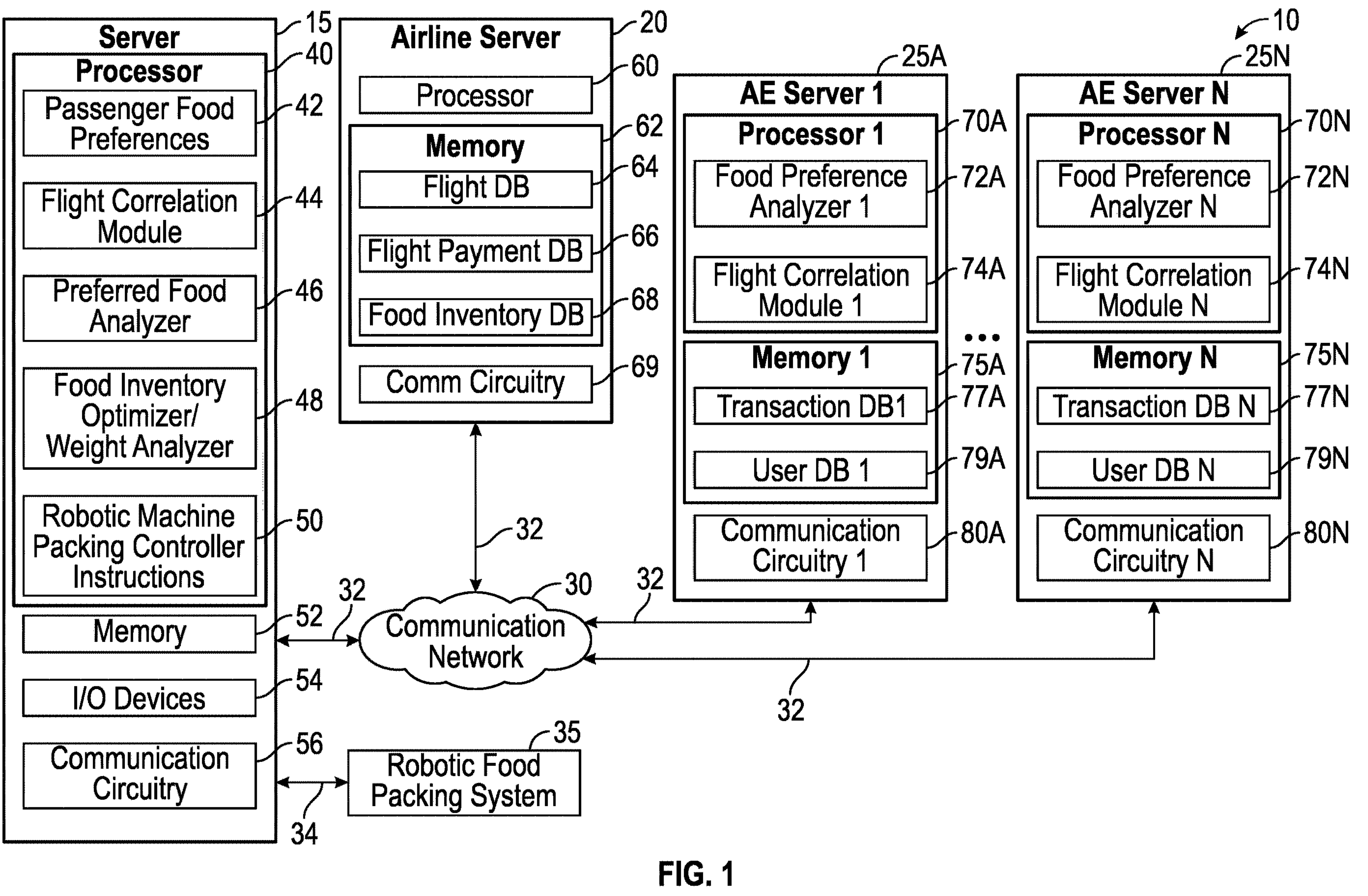
FIG. 1 depicts a block diagram of an exemplary system for managing a food inventory of a flight in accordance with one or more embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

Embodiments of the present disclosure herein describe a system and method for managing a food inventory of a flight. A server that may be associated with a food processing entity that provides meals to at least one airline, for example, may be configured to receive a food inventory to be serviced on a specific flight of the at least one airline. The server may then request from a computing device of the at least one airline, flight information about a plurality of flight passengers to fly on the specific flight of the at least one airline that purchased flight tickets using a payment cards issued by at least one card authorizing entity.

In some embodiments, using the flight information, the server may send a food preference request to a computing device associated with the at least one card authorizing entity. In response, the server may receive from the computing device associated with the at least one card authorizing entity, a plurality of passenger food preferences of the plurality of flight passengers. The plurality of passenger food preferences may be identified from historical payment card transaction data of the plurality of flight passengers, for example, within a predefined time period before the passenger's flight such as within six months, for example.

In some embodiments, the plurality of passenger food preferences may then be used to optimize the food inventory to be serviced on the specific flight of the at least one airline. For example, instead of the at least one airline having to stock extra types of food dishes in anticipation of what the passengers on a specific flight may prefer, the inventory may be updated to minimize the number of the extra types of anticipated food dishes with a more exact number of food dishes based on the plurality of passenger food preferences provided by the computing device associated with the at least one card authorizing entity.

The embodiments taught herein provides a technical solution for saving the at least one airline extra costs on both waste of uneaten food dishes, as well as additional fuel costs by reducing the weight of the onboard food inventory and overall weight of the aircraft. Moreover, the correct food preferences gleaned from payment card transactions of the flight passengers may be provided to each flight passenger on the specific flight which further increases customer satisfaction for airline customers. Furthermore, packing instructions based on the updated inventory may be transmitted by the server to at least one packing-related machine, such as a robotic airline meal trolley loader, to automatically load different food dishes into an airline meal trolley in accordance with the updated inventory. This further reduces costs of manpower needed to manually load the food trolleys.

FIG. 1 depicts a block diagram of an exemplary system 10 for managing a food inventory of a flight in accordance with one or more embodiments of the present disclosure. The system 10 may include a server 15 associated with a food processing entity, a computer device associated with at least one airline such as an airline server 20, and a computing device associated at least one card authorizing entity, such as an authorizing entity (AE) server1 25A . . . to an authorizing entity (AE) serverN 25N, where N is an integer, all communicating 32 over a communication network 30.

In some embodiments, each of the at least one card authorizing entity may be a financial institution issuing at least one payment card (e.g., credit card, or debit card). In other embodiments, there may be a separate airline server associated with each of the at least one airline, not shown in FIG. 1.

In some embodiments, the server 15 may include a processor 40, a non-transitory memory 52, input/output (I/O) devices 54, and a communication circuitry 56 for communicating 32 over the communication network 30 and communicating 34 with a robotic food packing system 35. The processor 40 may be configured to execute software modules such as for example, a passenger food preferences module 42, a flight correlation module 44, a preferred food analyzer module 46, a food inventory optimizer/weight analyzer module 48, and/or a robotic machine packing controller instructions module 50.

In some embodiments, the airline server 20 may include a processor 60, a non-transitory memory 62, and a communication circuitry 69 for communicating 32 over the communication network 30. The non-transitory memory 62 may be configured to store databases such as for example, a flight database (DB) 64, a flight payment DB 66, and/or a food inventory DB 68.

In some embodiments, the AE server1 25A may include a processor1 70A, a non-transitory memory1 75A, and/or communication circuitry1 80A for communicating 32 over the communication network 30. The processor1 70A may be configured to execute software modules such as for example, a food preference analyzer1 module 72A, and/or a flight correlation module1 74A. The non-transitory memory1 75A may be configured to store a transaction database1 (DB1) 77A and/or a user database1 (DB1) 79A of payment card holders and their transactions for extracting food preferences.

Similarly, the Nth AE serverN 25N may include a processorN 70N, a non-transitory memoryN 75N, and/or communication circuitryN 80N for communicating 32 over the communication network 30. The processorN 70N may be configured to execute software modules such as for example, a food preference analyzerN module 72N, and/or a flight correlation module1 74A. The non-transitory memoryN 75N may be configured to store a transaction databaseN (DBN) 77N and/or a user databaseN (DBN) 79N of payment card holders and their transactions for extracting food preferences. The difference AE servers (AEserver1 . . . AEserverN) may store transaction data of a plurality of passengers using payment cards issued by different authorizing entities to pay for the flight tickets of the specific flight (e.g., financial institutions) as identified from the flight payment DB 66 of the airline server 20.

In some embodiments, each of the computing devices may use their respective flight correlation module (e.g., 74A . . . 74N) to identify passengers from the plurality of passengers in their respective user databases (e.g., 79A . . . 79N) that used a payment card from one of the at least one card authorizing entity to pay for the airline ticket for the specific flight based on payment card transaction data in the respective transaction databases (77A . . . 77N).

In some embodiments, the historical transaction data of payment cards from the payment card from the flight payment card used by each of the plurality of passengers flying on the specific flights may be used to determine the food preferences of each of the passengers flying on the specific flight using the food preference analyzer1 72A . . . the food preference analyzer N 72N. Thus, when food preference request for the plurality of flight passengers based on the flight information may be sent from the server 15 to each of the computing devices 25A . . . 25N (AE Server1 . . . AE ServerN) associated with the at least one card authorizing entity, each of the computing devices associated with the at least one card authorizing entity may send a plurality of passenger food preferences to the server 15.

In some embodiments, the food preference analyzer1 72A . . . the food preference analyzerN 72, and/or the Preferred Food Analyzer 46 may use at least one machine learning model to identify the plurality of passenger food preferences from the plurality of payment card transactions for the plurality of flight passengers on a respective plurality of flights. The at least one machine learning model may include a supervised learning model, and/or a classification machine learning model. The at least one machine learning model may analyze merchant data and merchant metadata from the plurality of payment card transactions. Furthermore, when the types of cuisine and/or cuisine dishes may not be clear in any of the plurality of payment card transactions, third party databases may be used to identify the types of cuisine and/or types of dishes such as database(s) of food delivery service(s), for example.

In some embodiments, when the food preference analyzer (72A . . . 72N) identifies in a payment card transaction that a specific passenger charged a meal to the payment card in a short time before the flight such as within an hour, for example, this may be an indicator that the specific passenger may not eat on the specific flight.

Figure 2B:
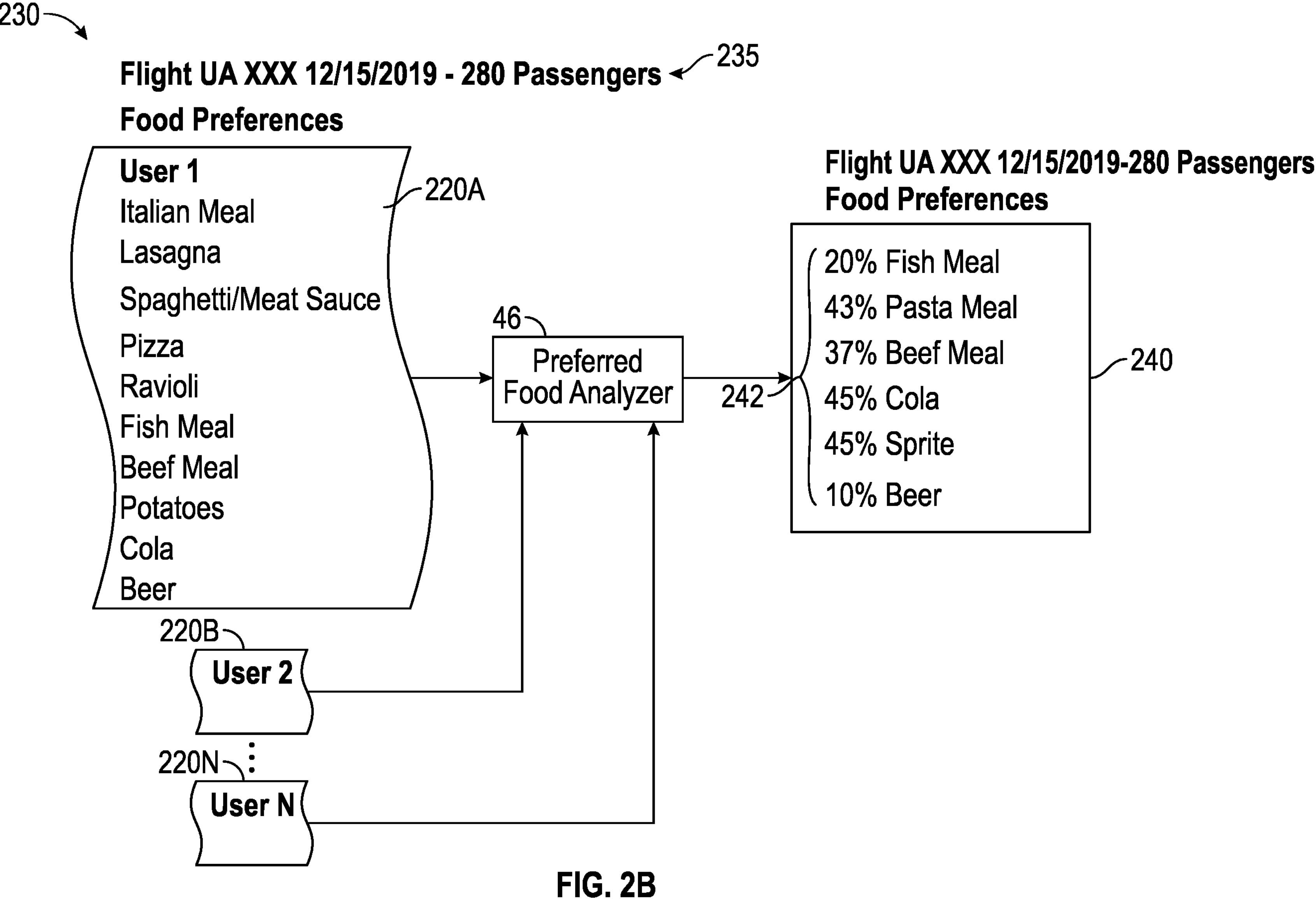

FIGS. 2A and 2B depict exemplary data elements for determining passenger food preferences on a flight in accordance with one or more embodiments of the present disclosure. FIG. 2A depicts two data elements, such as a two payment card transaction bills of a specific user from which passenger food preferences may be determined. For example, in FIG. 2A, a first data element 200 may be a transaction bill from Bella Italia Restaurant in Roma, Via Vitale 202 on a date 204 e.g., May 5, 2019. The bill itemizes dishes and beverages 205 ordered by the specific user for a total 207 bill of 66 Euros. In this case, the food preference analyzer 72A . . . 72N may identify at least one food preferences 220 from the first data element 200, e.g., Italian Meal, Lasagna, Spaghetti/Meat Sauce, Pizza, Vegetarian Ravioli and Beer.

Similarly, for a second data element 210 may be a transaction bill from MC Restaurant at 15 Fishamble Street, Dublin 202 on a date 214 e.g., Apr. 4, 2019. The bill itemizes dishes and beverages 215 ordered by the specific user for a total 217 bill of 75 Euros. In this case, the food preference analyzer 72A . . . 72N may identify at least one food preference 220 from the second data element 210, e.g., Fish Meal, Beef Meal, Beef Steak, Fish, Potatoes, and Cola.

In FIG. 2B, the food preference analyzer 72A . . . 72N may concatenate the at least one food preferences 220A extracted from both the first data element 200 and the second data element 210 from FIG. 2A for User 1 as shown in an updated at least one first data element 220A. The computing devices 25A . . . 25N associated with the at least one card authorizing entity may take all of the concatenated at least one food preferences 220A, 220B, . . . 220N for each of the N users from the computing device associated with one authorizing entity from the at least one card authorizing entity and send them over the communication network 30 to the server 15. The Preferred Food Analyzer 46 may prepare 242 a master food preference list 240 for passengers on flight UA XXX on Dec. 15, 2019 obtained from the computing devices 25A . . . 25N from the at least one card authorizing entity. In some embodiments, the preferred food analyzer 46 may generate a master food preference list 240 for the specific flight that may indicate percentages 242 of food dishes and beverages, for example, preferred by the passengers flying on flight UA XXX on Dec. 15, 2019.

Figure 3A:
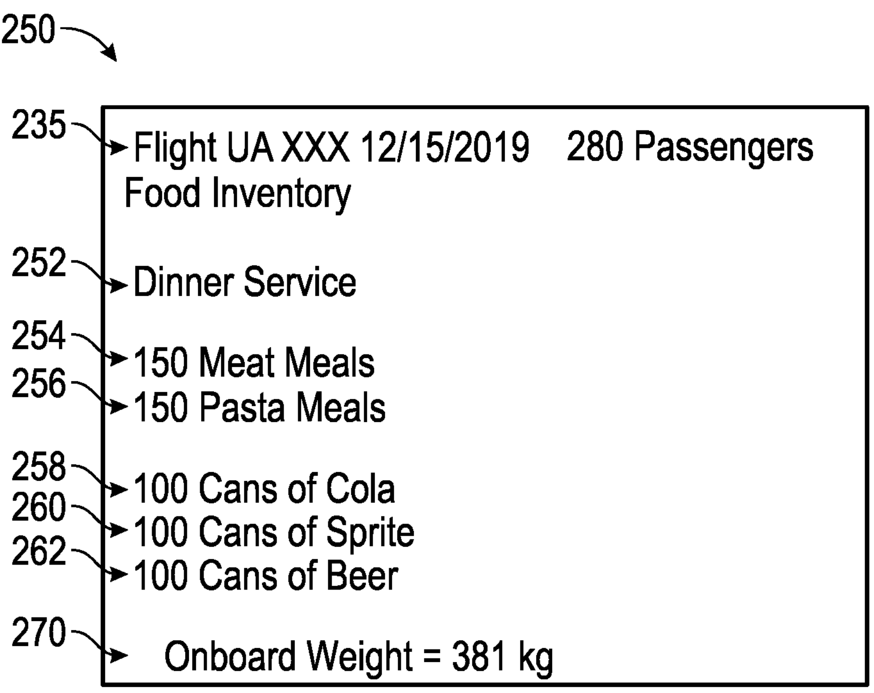
FIGS. 3A and 3B depict an initial food inventory and an updated food inventory of a flight based on the passenger food preferences in accordance with one or more embodiments of the present disclosure.
Figure 3B:
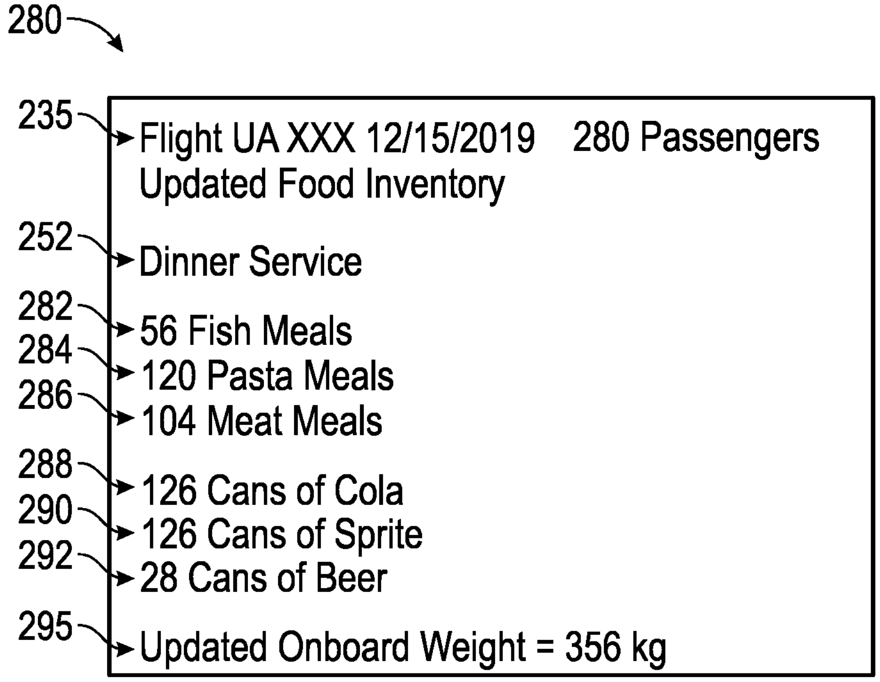

FIGS. 3A and 3B depict an initial food inventory 250 and an updated food inventory 280 of a flight based on the passenger food preferences in accordance with one or more embodiments of the present disclosure. The initial food inventory 250 may be received by the server 15 over the communication network from the food inventory DB 68 of the airline server 20. The initial food inventory 250 shows flight information 235 that flight UA XXX on Dec. 15, 2019 will have 280 passengers. For dinner service 252, the initial food inventory 250 may include, for example, 150 Meat Meals 254, 150 Pasta Meals 256, 100 Cans of Cola 258, 100 Cans of Sprite 260, and 100 Cans of Beer 262. An onboard weight 270 of this initial food inventory 250 may be estimated to be 381 kg. Note that 381 kg. may be calculated here assuming a typical airline meal may be 0.9 kg and a 12 oz. canned beverage may be 0.37 kg, which is not by way of limitation, but merely for conceptual clarity.

In some embodiments, the food inventory optimizer/weight analyzer 48 may apply the percentages 242 of food dishes and beverages preferred by the passengers flying on flight UA XXX on Dec. 15, 2019 in the master food preference list 240 to the initial food inventory 250. The food inventory optimizer/weight analyzer 48 may update the food inventory based on the preference food data in the master food preference list 240 by predicting the meal dishes and beverages that specific users may prefer. Using these food preferences, the initial food inventory 250 may be updated to better ensure that there is a correct count of meal dishes according to passenger food preferences, so as to reduce the overall number of reserve meal dishes and thus reducing the onboard weight.

In some embodiments, the updated food inventory 280 may include 56 Fish Meals 282, 120 Pasta Meals 284, 104 Meat meals 286, 126 Cans of Cola 288, 126 Cans of Sprite 290, and 26 cans of Beer 292, which reduces the onboard weight to 356 kg. The updated food inventory 280 may then be sent back to the food inventory database 68 of the airline server 20.

The embodiments disclosed herein analyze payment card transactions of a plurality of flight passengers identified by the flight correlation module 44 stored on multiple databases associated with at least one card authorizing entity, such as the credit card company, while determining food preferences from the payment card transactions for passengers travelling on the same specific flight as described herein above.

A problem for many airlines in managing food inventory on flights is that without any a priori knowledge of food preferences by the flight passengers, the flight may be overstocked with additional food and beverages so as to be able to cover the anticipated food preferences of the passengers adding additional weight to the aircraft. By using food preferences identified from terabytes of payment card transaction data, the embodiments herein provide a technical solution to not only optimize the food inventory and weight by using the updated food inventory 280 for a specific flight, but also to control a robotic airline meal trolley loader in automating the loading of the airline meal trolley with different meal dishes in accordance with the updated food inventory 280 based on the master food preference list 240 for the specific flight. The updated food inventory 280 may be inputted into a robotic machine packing controller instruction generator 50 to generate instructions to control robotic airline meal trolley loader as described hereinbelow.

Figures 4A, 4B:
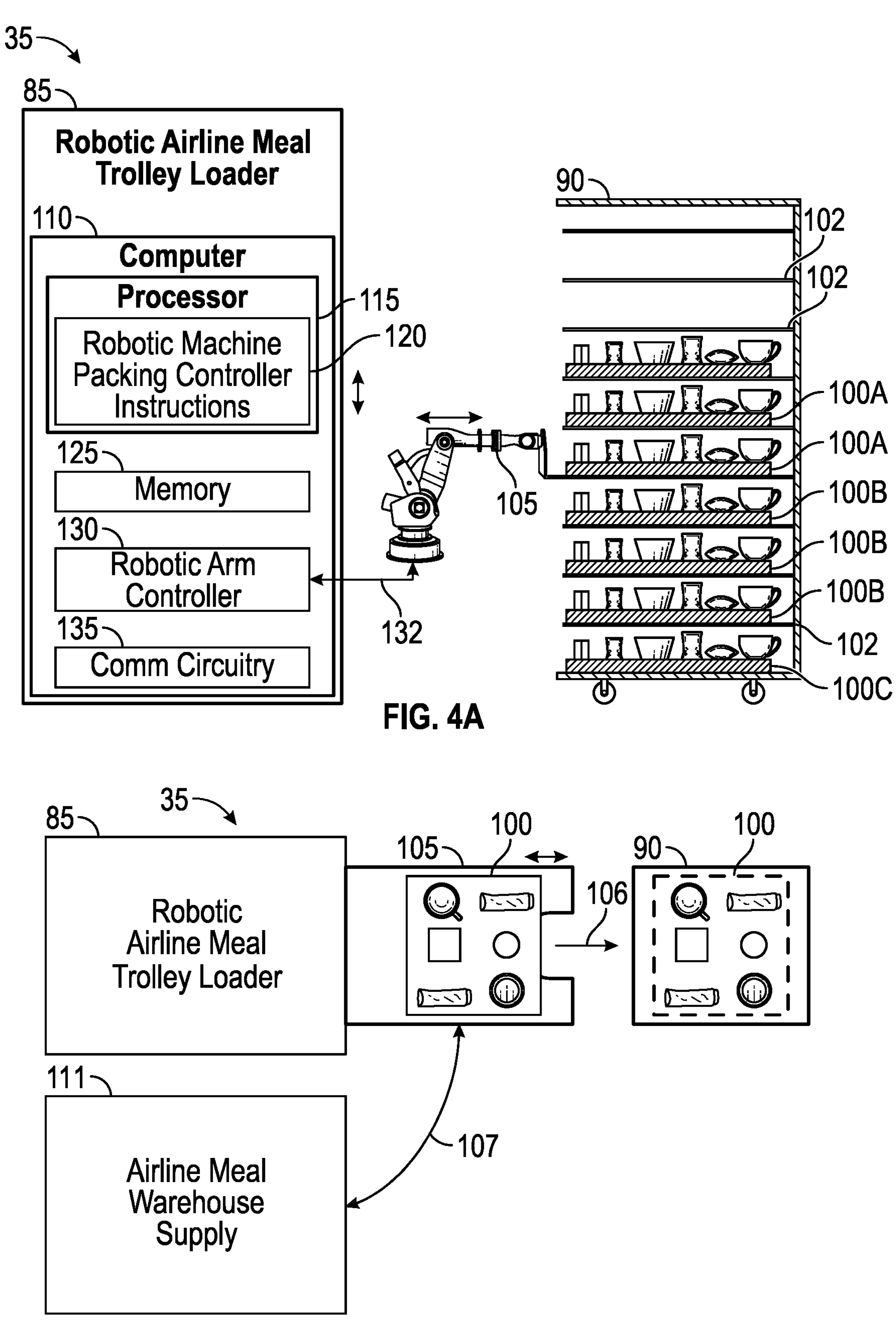
FIGS. 4A and 4B depict a robotic food packing system in accordance with one or more embodiments of the present disclosure.

FIGS. 4A and 4B depict a robotic food packing system 35 in accordance with one or more embodiments of the present disclosure. FIG. 4A illustrates a side view of the robotic food packing system 35 and FIG. 4B illustrates a top view of the robotic food packing system 35. The robotic food packing system 35 may be configured to receive at least one food packing instruction for at least one packing-related machine for the automated loading of at least one airline meal trolley 90 with a plurality of different food meals 100A, 100B, and 100C, for example in accordance with the food preferences determined from the payment card transaction data of the flight passengers.

In some embodiments, a robotic airline meal trolley loader 85 may include a computer 110, a memory 125, a robotic arm controller 130 to control 132 a robotic arm 105 for loading the at least one airline meal trolley 90, and communication circuitry 135 for communicating 32 with the server 15.

In some embodiments, the computer 110 may include a processor 115 configured to execute robotic machine packing controller instructions 120 (e.g., the at least one food packing instruction). The robotic machine packing controller instructions 120 may be used to control the robotic arm to load the different airline meals 100A, 100B, and 100C into trolley 90 into different trolley compartments separated by a plurality of trolley compartment separators 102 in accordance with the updated food inventory 280. For example, with regard to FIG. 3B, the airline meal 100A may include the meat meal 286, the airline meal 100B may include the pasta meal 284, and the airline meal 100C may include the fish meal 282.

The top view of the robotic food packing system 35 shown in FIG. 4B may illustrate the robotic arm rotating 107 to choose one of the airline meals 100 from the three types of airline meals 100A, 100B, 100C from an airline meal warehouse supply 111 and rotate 107 back to load 106 the chosen airline meal 100 into the at least one airline meal trolley 90.

In some embodiments, the server 15 may transmit the at least one food packing instruction to the at least one packing-related machine in a predefined time interval before a departure time of the specific flight.

In some embodiments, the preference food analyzer 46 may use the plurality of passenger food preferences based on historical records of the updated food inventory 280 for a specific flight (e.g., date, time, airline, and/or destination) and how much food and/or beverages were actually consumed on the specific flight.

In some embodiments, a specific flight passenger with a payment card associated with the at least one card authorizing entity may receive an incentive (e.g., reward, payment token and/or voucher) from the at least one card authorizing entity to purchase food and/or beverages in the airport terminal prior to the specific flight and to waive the onboard airline meal, which may be deducted from the updated food inventory 280 for the specific flight passenger. In other embodiments, the AE server 25A . . . 25N associated with the at least one card authorizing entity may store a list of food vendors and/or restaurants located in airport terminals for a plurality of airports for providing these incentives.

In some embodiments, food preferences of a specific flight passenger on a specific flight may be identified from payment card transaction records of the specific flight passenger. A passenger-specific meal based on the passenger's food preferences may be given to the passenger without the onboard flight staff asking the passenger as to which desired meal that the passenger prefers. This may reduce the amount of time that the onboard flight staff may need to service all of the passengers in the flight cabin.

In some embodiments, an airport lounge may use the plurality of passenger food preferences to determine which foods and/or beverage prior to a specific flight to stock the lounge with.

In some embodiments, the airline may use the plurality of passenger food preferences to negotiate cheaper prices for purchasing the airline food and/or beverages from third party vendor.

The embodiments shown in FIGS. 2A-2B, 3A-3B, and 4A-4B not by way of limitation but merely for visual and conceptual clarity of the embodiments disclosed herein. Any number of types of meals may be used and any number of food preferences may be determined from the plurality of payment card transactions for loading any number or any configuration of the at least one airline meal trolley 90.

For example, many different types of meals may be provided for first class flight passengers relative to economy class flight passengers. The embodiments herein may provide a method for determining a finer choice of a meat meal, pasta meal, or a fish meal, for example, to a first-class flight passenger. The preferred food analyzer 46 may identify from the payment card transactions that a specific first-class flight passenger may prefer meat, pasta, and/or fish meals like veal scaloppini, fettucine alfredo, or trout almandine, for example, that may be loaded on-board at least one airline meal trolley 90 that may service the first-class passengers by applying the embodiments disclosed herein.

FIG. 5 illustrates a flowchart of an exemplary method 300 for managing a food inventory of a flight in accordance with one or more embodiments of the present disclosure. The method may be performed by the processor 40 of the server 15.

The method 300 may include receiving 310, by the processor 40 of the server 15, over the communication network 30, a flight information from a computer device associated with at least one airline, the flight information identifying at least one flight identifier of at least one flight, and a plurality of flight passengers on the at least one flight that purchased flight tickets by utilizing payment cards associated with at least one card authorizing entity.

The method 300 may include automatically transmitting 320 a food preference request for the plurality of flight passengers to a computing device associated with the at least one card authorizing entity based on the flight information.

The method 300 may include receiving 330 in response to the food preference request, from the computing device associated with the at least one card authorizing entity, a plurality of passenger food preferences for the plurality of flight passengers based at least in part on historical payment card transaction data of the plurality of flight passengers, where the plurality of passenger food preferences distinguish among types of foods preferred by the plurality of flight passengers.

The method 300 may include determining 340 a plurality of preferred foods from the passenger food preferences of the plurality of flight passengers.

The method 300 may include receiving 350 a food inventory available to be serviced on the at least one flight, where the food inventory identifies a weight of each food in the food inventory.

The method 300 may include automatically determining 360 for a specific flight, based on the flight information, a flight-specific subset of flight passengers from the plurality of flight passengers based on a specific flight identifier of the specific flight.

The method 300 may include automatically determining 370 a flight-specific food inventory, to minimize an overall weight of the flight-specific food inventory to be carried by the specific flight based at least in part on the plurality of preferred foods of the flight-specific subset of the plurality of flight passengers and the food inventory.

The method 300 may include automatically transmitting 380 at least one food packing instruction to at least one packing-related machine based at least in part on the flight-specific food inventory so as to assemble at least a portion of the flight-specific food inventory.

In some embodiments, exemplary inventive, specially programmed computing systems/platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiments, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a social media post, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) FreeBSD, NetBSD, OpenBSD; (2) Linux; (3) Microsoft Windows; (4) OS X (MacOS); (5) MacOS 11; (6) Solaris; (7) Android; (8) iOS; (9) Embedded Linux; (10) Tizen; (11) WebOS; (12) IBM i; (13) IBM AIX; (14) Binary Runtime Environment for Wireless (BREW); (15) Cocoa (API); (16) Cocoa Touch; (17) Java Platforms; (18) JavaFX; (19) JavaFX Mobile; (20) Microsoft DirectX; (21) .NET Framework; (22) Silverlight; (23) Open Web Platform; (24) Oracle Database; (25) Qt; (26) Eclipse Rich Client Platform; (27) SAP NetWeaver; (28) Smartface; and/or (29) Windows Runtime.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, exemplary inventive computer-based systems/platforms, exemplary inventive computer-based devices, and/or exemplary inventive computer-based components of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, the terms "proximity detection," "locating," "location data," "location information," and "location tracking" refer to any form of location tracking technology or locating method that can be used to provide a location of, for example, a particular computing device/system/platform of the present disclosure and/or any associated computing devices, based at least in part on one or more of the following techniques/devices, without limitation: accelerometer(s), gyroscope(s), Global Positioning Systems (GPS); GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, the terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the exemplary inventive computer-based systems/platforms, the exemplary inventive computer-based devices, and/or the exemplary inventive computer-based components of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTR0, SHA-1, SHA-2, Tiger (TTH), WHIRLPOOL, RNGs).

The aforementioned examples are, of course, illustrative and not restrictive.

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

Figure 6:
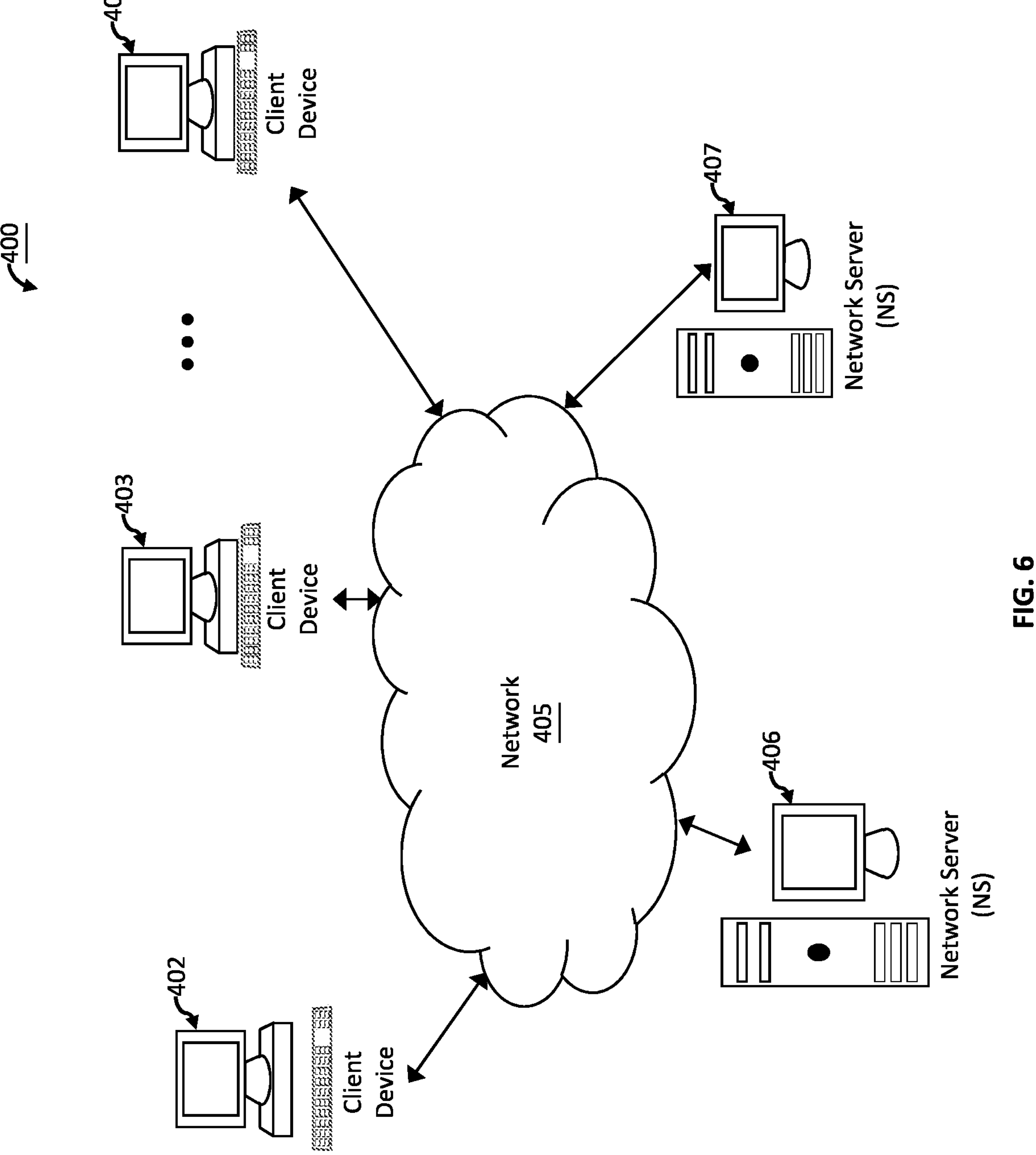
FIG. 6 depicts a block diagram of an exemplary computer-based system/platform in accordance with one or more embodiments of the present disclosure.

FIG. 6 depicts a block diagram of an exemplary computer-based system/platform 400 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform 400 may be configured to manage a large number of members and/or concurrent transactions, as detailed herein. In some embodiments, the exemplary computer-based system/platform 400 may be based on a scalable computer and/or network architecture that incorporates varies strategies for assessing the data, caching, searching, and/or database connection pooling. An example of the scalable architecture is an architecture that is capable of operating multiple servers.

In some embodiments, referring to FIG. 6, members 402-404 (e.g., clients) of the exemplary computer-based system/platform 400 may include virtually any computing device capable of receiving and sending a message over a network (e.g., cloud network), such as network 405, to and from another computing device, such as servers 406 and 407, each other, and the like. In some embodiments, the member devices 402-404 may be personal computers, multiprocessor systems, microprocessor-based or programmable consumer electronics, network PCs, and the like. In some embodiments, one or more member devices within member devices 402-404 may include computing devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 402-404 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 402-404 may include may run one or more applications, such as Internet browsers, mobile applications, voice calls, video games, videoconferencing, and email, among others. In some embodiments, one or more member devices within member devices 402-404 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 402-404 may be specifically programmed by either Java, .Net, QT, C, C++ and/or other suitable programming language. In some embodiments, one or more member devices within member devices 402-404 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 405 may provide network access, data transport and/or other services to any computing device coupled to it. In some embodiments, the exemplary network 405 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 405 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 405 may include and implement, as an alternative or in conjunction with one or more of the above, a WiMAX architecture defined by the WiMAX forum. In some embodiments and, optionally, in combination of any embodiment described above or below, the exemplary network 405 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 405 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 405 may also include mass storage, such as network attached storage (NAS), a storage area network (SAN), a content delivery network (CDN) or other forms of computer or machine readable media.

In some embodiments, the exemplary server 406 or the exemplary server 407 may be a web server (or a series of servers) running a network operating system, examples of which may include but are not limited to Microsoft Windows Server, Novell NetWare, or Linux. In some embodiments, the exemplary server 406 or the exemplary server 407 may be used for and/or provide cloud and/or network computing. Although not shown in FIG. 6, in some embodiments, the exemplary server 406 or the exemplary server 407 may have connections to external systems like email, SMS messaging, text messaging, ad content providers, etc. Any of the features of the exemplary server 406 may be also implemented in the exemplary server 407 and vice versa.

In some embodiments, one or more of the exemplary servers 406 and 407 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 401-404.

In some embodiments and, optionally, in combination of any embodiment described above or below, for example, one or more exemplary computing member devices 402-404, the exemplary server 406, and/or the exemplary server 407 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 7:
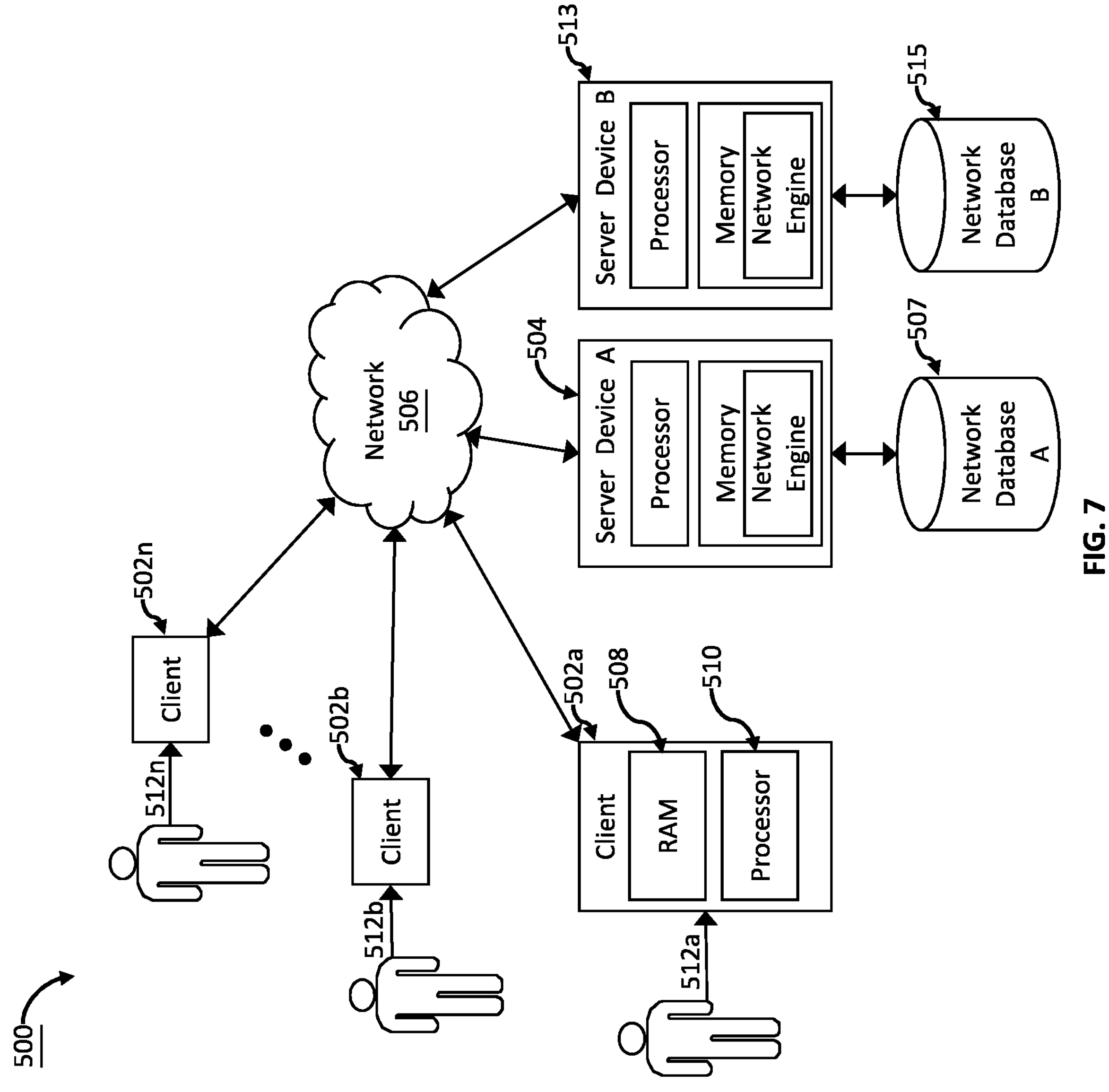
FIG. 7 depicts a block diagram of another exemplary computer-based system/platform in accordance with one or more embodiments of the present disclosure.

FIG. 7 depicts a block diagram of another exemplary computer-based system/platform 500 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 502*a*, 502*b* thru 502*n* shown each at least includes a computer-readable medium, such as a random-access memory (RAM) 508 coupled to a processor 510 or FLASH memory. In some embodiments, the processor 510 may execute computer-executable program instructions stored in memory 508. In some embodiments, the processor 510 may include a microprocessor, an ASIC, and/or a state machine. In some embodiments, the processor 510 may include, or may be in communication with, media, for example computer-readable media, which stores instructions that, when executed by the processor 510, may cause the processor 510 to perform one or more steps described herein. In some embodiments, examples of computer-readable media may include, but are not limited to, an electronic, optical, magnetic, or other storage or transmission device capable of providing a processor, such as the processor 510 of client 502*a*, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 502*a* through 502*n* may also comprise a number of external or internal devices such as a mouse, a CD-ROM, DVD, a physical or virtual keyboard, a display, a speaker, or other input or output devices. In some embodiments, examples of member computing devices 502*a* through 502*n* (e.g., clients) may be any type of processor-based platforms that are connected to a network 506 such as, without limitation, personal computers, digital assistants, personal digital assistants, smart phones, pagers, digital tablets, laptop computers, Internet appliances, and other processor-based devices. In some embodiments, member computing devices 502*a* through 502*n* may be specifically programmed with one or more application programs in accordance with one or more principles/methodologies detailed herein. In some embodiments, member computing devices 502*a* through 502*n* may operate on any operating system capable of supporting a browser or browser-enabled application, such as Microsoft™, Windows™, and/or Linux. In some embodiments, member computing devices 502*a* through 502*n* shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 502*a* through 502*n*, users, 512*a* through 512*n*, may communicate over the exemplary network 506 with each other and/or with other systems and/or devices coupled to the network 506. As shown in FIG. 7, exemplary server devices 504 and 513 may be also coupled to the network 506. In some embodiments, one or more member computing devices 502*a* through 502*n* may be mobile clients.

In some embodiments, at least one database of exemplary databases 507 and 515 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 8:
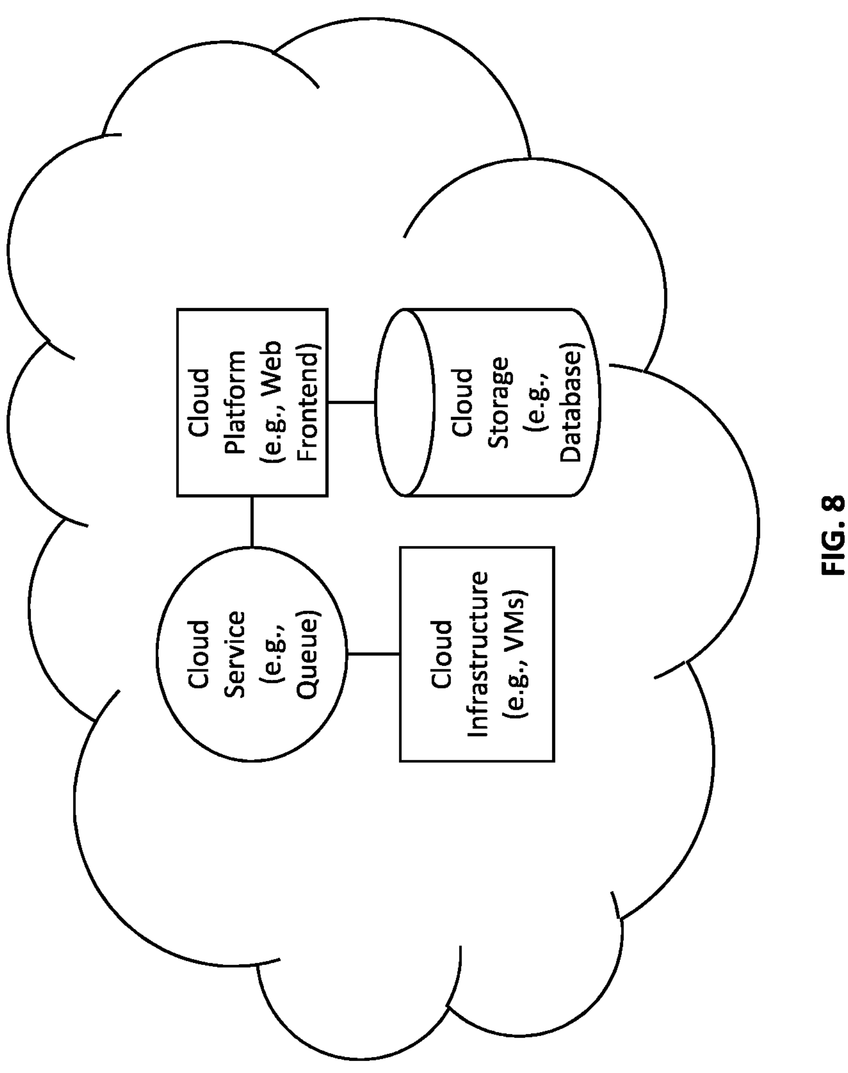
FIGS. 8 and 9 are diagrams illustrating implementations of cloud computing architecture/aspects with respect to which the disclosed technology may be specifically configured to operate, in accordance with one or more embodiments of the present disclosure.
Figure 9:
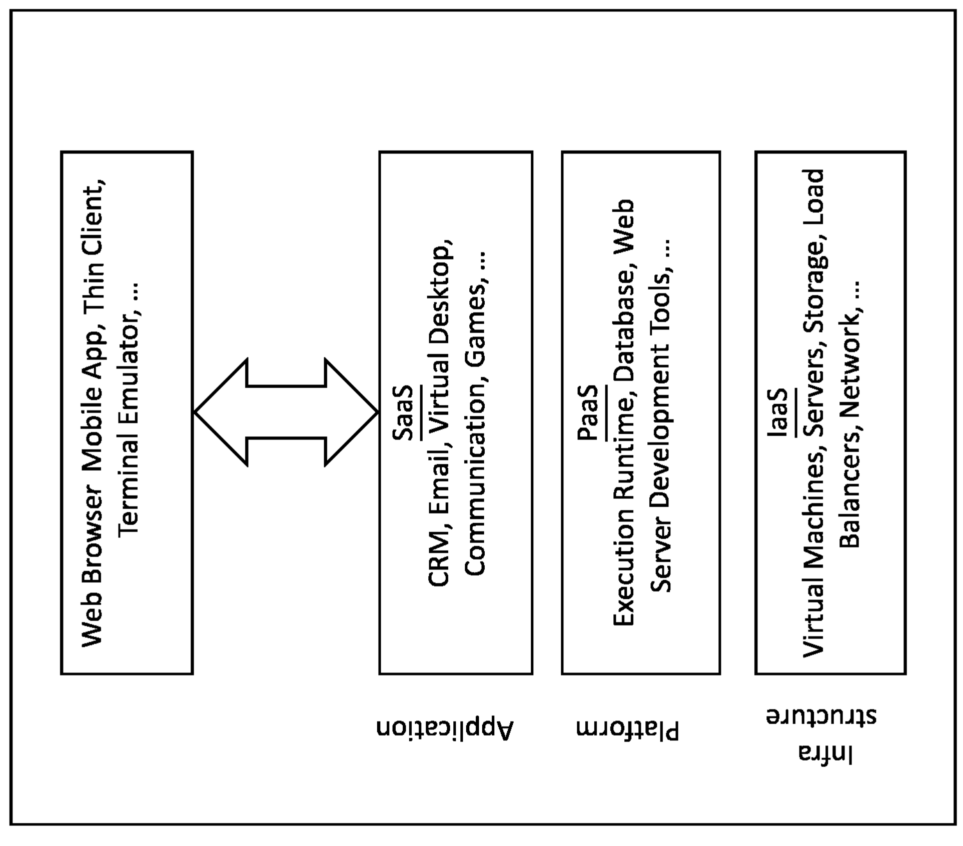

In some embodiments, the exemplary inventive computer-based systems/platforms, the exemplary inventive computer-based devices, and/or the exemplary inventive computer-based components of the present disclosure may be specifically configured to operate in an cloud computing/architecture such as, but not limiting to: infrastructure a service (IaaS), platform as a service (PaaS), and/or software as a service (SaaS). FIGS. 8 and 9 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate.

At least some aspects of the present disclosure will now be described with reference to the following numbered clauses.

1. A method may include:

receiving, by a processor of a server, over a communication network, a flight information from a computer device associated with at least one airline, the flight information identifying:

i) at least one flight identifier of at least one flight, and ii) a plurality of flight passengers on the at least one flight that purchased flight tickets by utilizing payment cards associated with at least one card authorizing entity;

automatically transmitting, by the processor, a food preference request for the plurality of flight passengers to a computing device associated with the at least one card authorizing entity based on the flight information;

receiving, by the processor, in response to the food preference request, from the computing device associated with the at least one card authorizing entity, a plurality of passenger food preferences for the plurality of flight passengers based at least in part on historical payment card transaction data of the plurality of flight passengers;

where the plurality of passenger food preferences may distinguish among types of foods preferred by the plurality of flight passengers;

automatically determining, by the processor, a plurality of preferred foods from the passenger food preferences of the plurality of flight passengers;

receiving, by the processor, a food inventory available to be serviced on the at least one flight;

where the food inventory may identify a weight of each food in the food inventory;

automatically determining, by the processor, for a specific flight, based on the flight information, a flight-specific subset of flight passengers from the plurality of flight passengers based on a specific flight identifier of the specific flight;

automatically determining, by the processor, a flight-specific food inventory, to minimize an overall weight of the flight-specific food inventory to be carried by the specific flight based at least in part on:

i) the plurality of preferred foods of the flight-specific subset of the plurality of flight passengers and ii) the food inventory; and automatically transmitting, by the processor, at least one food packing instruction to at least one packing-related machine based at least in part on the flight-specific food inventory so as to assemble at least a portion of the flight-specific food inventory.

2. The method according to clause 1, where the automatically transmitting the food preference request for the plurality of flight passengers may include transmitting a cuisine preference request, a beverage preference request, or both for the plurality of flight passengers to the computing device.

3. The method as in any of clauses 1-2, where the receiving the plurality of passenger food preferences may include receiving a plurality of passenger cuisine preferences, a plurality of passenger beverage preferences, or any combination thereof.

4. The method as in any of clauses 1-3, where the automatically determining the plurality of preferred foods from the passenger food preferences of the plurality of flight passengers may include determining a plurality of preferred cuisines, a plurality of preferred beverages, or any combination thereof, from the passenger food preferences of the plurality of flight passengers.

5. The method as in any of clauses 1-4, where the receiving the food inventory available to be serviced on the at least one flight may include receiving a cuisine inventory, a beverage inventory, or both available to be serviced on the at least one flight.

6. The method as in any of clauses 1-5, where the automatically transmitting the at least one food packing instruction to the at least one packing-related machine may include transmitting the at least one food packing instruction to the at least one packing-related machine in a predefined time interval before a departure time of the specific flight.

7. The method as in any of clauses 1-6, where the plurality of passenger food preferences distinguish among the types of foods that may be selected from the group consisting of types of cuisine dishes, types of beverages, and types of snacks.

8. A system may include:

a non-transitory memory for storing computer code; and a processor of a server configured to execute the computer code that causes the processor to:

receive, over a communication network, a flight information from a computer device associated with at least one airline, the flight information identifying:

i) at least one flight identifier of at least one flight, and ii) a plurality of flight passengers on the at least one flight that purchased flight tickets by utilizing payment cards associated with at least one card authorizing entity;

automatically transmit a food preference request for the plurality of flight passengers to a computing device associated with the at least one card authorizing entity based on the flight information;

receive in response to the food preference request, from the computing device associated with the at least one card authorizing entity, a plurality of passenger food preferences for the plurality of flight passengers based at least in part on historical payment card transaction data of the plurality of flight passengers;

where the plurality of passenger food preferences may be distinguish among types of foods preferred by the plurality of flight passengers;

automatically determine a plurality of preferred foods from the passenger food preferences of the plurality of flight passengers;

receive a food inventory available to be serviced on the at least one flight;

where the food inventory may identify a weight of each food in the food inventory;

automatically determine for a specific flight, based on the flight information, a flight-specific subset of flight passengers from the plurality of flight passengers based on a specific flight identifier of the specific flight;

automatically determine a flight-specific food inventory, to minimize an overall weight of the flight-specific food inventory to be carried by the specific flight based at least in part on:

i) the plurality of preferred foods of the flight-specific subset of the plurality of flight passengers and ii) the food inventory; and automatically transmit at least one food packing instruction to at least one packing-related machine based at least in part on the flight-specific food inventory so as to assemble at least a portion of the flight-specific food inventory.

9. The system according to clause 8, where the processor may be configured to automatically transmit the food preference request for the plurality of flight passengers by transmitting a cuisine preference request, a beverage preference request, or both for the plurality of flight passengers to the computing device.

10. The system as in any of clauses 8-9, where the processor may be configured to receive the plurality of passenger food preferences by receiving a plurality of passenger cuisine preferences, a plurality of passenger beverage preferences, or any combination thereof.

11. The system as in any of clauses 8-10, where the processor may be configured to automatically determine the plurality of preferred foods from the passenger food preferences of the plurality of flight passengers by determining a plurality of preferred cuisines, a plurality of preferred beverages, or any combination thereof, from the passenger food preferences of the plurality of flight passengers.

12. The system as in any of clauses 8-11, where the processor may be configured to receive the food inventory available to be serviced on the at least one flight by receiving a cuisine inventory, a beverage inventory, or both available to be serviced on the at least one flight.

13. The system as in any of clauses 8-12, where the processor may be configured to automatically transmit the at least one food packing instruction to the at least one packing-related machine by transmitting the at least one food packing instruction to the at least one packing-related machine in a predefined time interval before a departure time of the specific flight.

14. A method may include:

receiving, by a processor of a server, over a communication network, a flight information from a computer device associated with at least one airline, the flight information identifying:

i) at least one flight identifier of at least one flight, and ii) a plurality of flight passengers on the at least one flight that purchased flight tickets by utilizing payment cards associated with at least one card authorizing entity;

automatically determining, by the processor, for a specific flight, based on the flight information, a flight-specific subset of flight passengers from the plurality of flight passengers based on a specific flight identifier of the specific flight;

automatically transmitting, by the processor, a flight-specific food preference request for the plurality of flight passengers to a computing device associated with the at least one card authorizing entity based on the flight information;

receiving, by the processor, in response to the flight-specific food preference request, from the computing device associated with the at least one card authorizing entity, a plurality of passenger food preferences for the plurality of flight passengers based at least in part on historical payment card transaction data of the plurality of flight passengers;

where the plurality of passenger food preferences may distinguish among types of foods preferred by the plurality of flight passengers;

automatically determining, by the processor, a plurality of preferred foods from the passenger food preferences of the plurality of flight passengers;

receiving, by the processor, a food inventory available to be serviced on the at least one flight;

where the food inventory may identify a weight of each food in the food inventory;

automatically determining, by the processor, a flight-specific food inventory, to minimize an overall weight of the flight-specific food inventory to be carried by the specific flight based at least in part on:

i) the plurality of preferred foods of the flight-specific subset of the plurality of flight passengers and ii) the food inventory; and automatically transmitting, by the processor, at least one food packing instruction to at least one packing-related machine based at least in part on the flight-specific food inventory so as to assemble at least a portion of the flight-specific food inventory.

15. The method according to clause 14, where the automatically transmitting the food preference request for the plurality of flight passengers may include transmitting a flight-specific cuisine preference request, a flight-specific beverage preference request, or both for the plurality of flight passengers to the computing device.

16. The method as in any of clauses 14-15, where the receiving the plurality of passenger food preferences may include receiving a plurality of passenger cuisine preferences, a plurality of passenger beverage preferences, or any combination thereof.

17. The method as in any of clauses 14-16, where the determining the plurality of preferred foods from the passenger food preferences of the plurality of flight passengers may include determining a plurality of preferred cuisines, a plurality of preferred beverages, or any combination thereof, from the passenger food preferences of the plurality of flight passengers.

18. The method as in any of clauses 14-17, where receiving the food inventory available to be serviced on the at least one flight may include receiving a cuisine inventory, a beverage inventory, or both available to be serviced on the at least one flight.

19. The method as in any of clauses 14-18, where the automatically transmitting the at least one food packing instruction to the at least one packing-related machine may include transmitting the at least one food packing instruction to the at least one packing-related machine in a predefined time interval before a departure time of the specific flight.

20. The method as in any of clauses 14-19, where the plurality of passenger food preferences distinguish among the types of foods may be selected from the group consisting of types of cuisine dishes, types of beverages, and types of snacks.

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

What is claimed is:

1. A method comprising:

receiving, by a processor of a first computing device, flight information comprising a flight identifier, a first identifier identifying a first payment card used for purchasing a first flight ticket identified by the flight identifier, and second identifier identifying a second payment card used for purchasing a flight ticket identified by the flight identifier;

transmitting, by the processor, the first identifier to a second computing device associated with a first entity that authorized the first payment card identified by the first identifier;

transmitting, by the processor, the second identifier to a third computing device associated with a second entity that authorized the second payment card identified by the second identifier;

receiving, by the processor, from the second computing device, a first food preference generated by the second computing device executing a first trained machine learning model with the first identifier as an input;

receiving, by the processor, from the third computing device, a second food preference generated by the third computing device executing a second trained machine learning model with the second identifier as an input;

determining, by the processor, based at least in part on the first and second food preferences, a food packing instruction for the flight;

receiving, by the processor, from the second computing device, transaction information indicating a charge for a meal by the first payment card identified by the first identifier, the charge occurred within a predetermined time before a departure time of the flight;

determining, by the processor based on the transaction information, an exclusion of a food item associated with the first food preference from the food packing instruction, wherein the food packing instruction is updated to deduct the food item associated with the first food preference based on the charge; and automatically transmitting, by the processor, the updated food packing instruction to a food packing system comprising a packing related machine, to pack a food inventory based on the updated food packing instruction, wherein the food packing system utilizes the updated food packing instruction to automatically load the food inventory into an airline meal transport device dedicated for the flight.

2. The method of claim 1, wherein the food inventory is delivered to airport lounge at a departure airport of the flight.

3. The method of claim 1, wherein the food packing instruction is transmitted to the at least one packing-related machine in a predefined time interval before a departure time of the flight.

4. The method of claim 1, wherein the second computing device is configured to determine the first food preference based at least in part on historical payment card transaction data associated with the first identifier using the first trained machine learning model.

5. A method comprising:

receiving, by a processor of a first computing device from an airline associated computing device, flight information comprising a flight identifier, a first identifier identifying a first payment card used for purchasing a first flight ticket identified by the flight identifier, and a second identifier identifying a second payment card used for purchasing a second flight ticket identified by the flight identifier;

transmitting, by the processor, the first identifier to a second computing device associated with a first entity that authorized the first payment card identified by the first identifier;

transmitting, by the processor, the second identifier to a third computing device associated with a second entity that authorized the second payment card identified by the second identifier;

receiving, by the processor, from the second computing device, a first food preference generated by the second computing device executing a first trained machine learning model with the first identifier as an input;

receiving, by the processor, from the third computing device, a second food preference generated by the third computing device executing a second trained machine learning model with the second identifier as an input;

determining, by the processor based at least in part on the first and second food preferences, a food packing instruction for the flight;

receiving, by the processor from the second computing device, transaction information indicating a charge for a meal by the first payment card identified by the first identifier, the charge occurred within a predetermined time before a departure time of the flight;

determining, by the processor based on the transaction information, an exclusion of a food item associated with the first food preference from the food packing instruction, wherein the food packing instruction is updated to deduct the food item associated with the first food preference based on the charge; and automatically transmitting, by the processor, the updated food packing instruction to a food packing system comprising a packing related machine, to pack a food inventory based on the updated food packing instruction, wherein the food packing system utilizes the updated food packing instruction to automatically load the food inventory into an airline meal transport device dedicated for the flight.

6. The method of claim 5, wherein the second computing device determines the first food preference based at least in part on historical payment card transaction data associated with the first identifier using the first trained machine learning model.

7. A method comprising:

receiving, by a processor of a first computing device, flight information comprising a flight identifier, a first identifier identifying a first payment card used for purchasing a first flight ticket identified by the flight identifier, and a second identifier identifying second payment card used for purchasing a flight ticket identified by the flight identifier;

transmitting, by the processor, the first identifier to a second computing device associated with a first entity that authorized the first payment card identified by the first identifier;

transmitting, by the processor, the second identifier to a third computing device associated with a second entity that authorized the second payment card identified by the second identifier;

receiving, by the processor from the second computing device, a first food preference generated by the second computing device executing a first trained machine learning model with the first identifier as an input;

receiving, by the processor from the third computing device, a second food preference generated by the third computing device executing a second trained machine learning model with the second identifier as an input;

determining, by the processor based at least in part on the first and second food preferences, a food packing instruction for the flight;

causing, by the processor, data to be presented to a fourth computing device associated with the first identifier, wherein the data is indicative of an incentive to purchase a food item related to the first food preference in an airport prior to the flight;

determining, by the processor, an acceptance of the incentive based at least in part on a purchase of the food item by the first payment card identified by the first identifier within a predetermined time before a departure of the flight;

determining, by the processor based on the purchase of the food item, an exclusion of the food item from the food packing instruction, wherein the food packing instruction is updated to deduct the food item associated with the first food preference based on the incentivized purchase; and automatically transmitting, by the processor, the updated food packing instruction to a food packing system comprising a packing related machine, to pack a food inventory based on the updated food packing instruction, wherein the food packing system utilizes the updated food packing instruction to automatically load the food inventory into an airline meal transport device dedicated for the flight.

8. The method of claim 7, wherein the first machine learning model determines the first food preference based at least in part on historical payment card transaction data associated with the first identifier.

9. The method of claim 8, wherein the historical payment card transaction data is from within a predefined time period before the flight.

10. The method of claim 7, wherein the first food preference is determined based on historical payment card transaction data from a predefined time period before the flight.

11. The method of claim 10, wherein the predefined time period comprises six months before the flight.

12. The method of claim 7, wherein the food packing instruction is transmitted to the at least one packing-related machine in a predefined time interval before a departure time of the flight.

13. The method of claim 7, further comprising using the food packing instruction to negotiate a price for purchasing food for the food inventory.

14. The method of claim 7, wherein the first trained machine learning model is configured to determine, from historical payment card transaction data, a type of cuisine or type of dish associated with each of a plurality of transactions of the historical payment card transaction data.

* * * * *